G. D. GILMORE.
COMBINATION THEFT NOTICE AND ILLUMINATED LICENSE PLATE.
APPLICATION FILED DEC. 26, 1917.
1,283,150.
Patented Oct. 29, 1918.
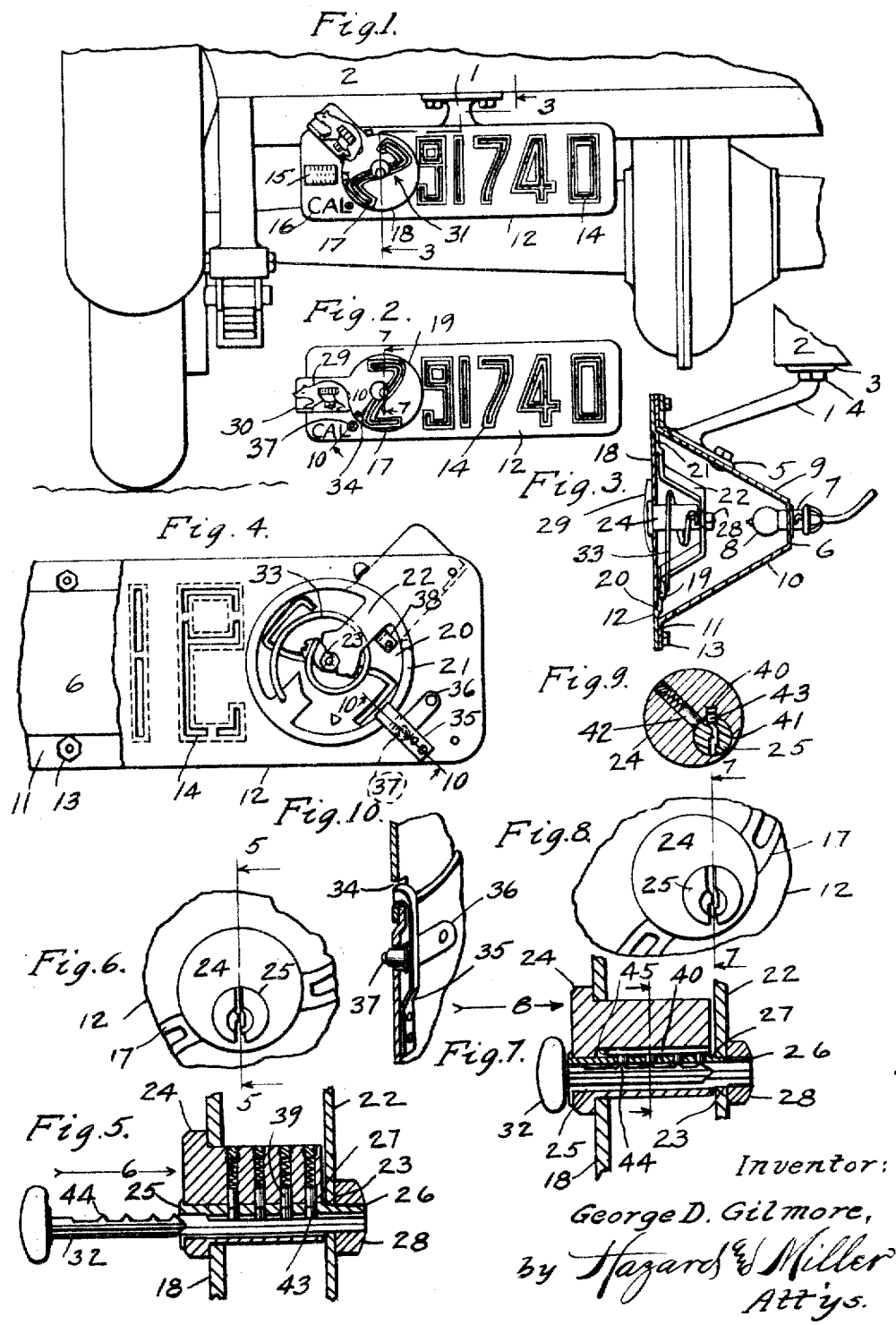
Inventor:
George D. Gilmore,
by Hazard & Miller
Att'ys.

UNITED STATES PATENT OFFICE.

GEORGE D. GILMORE, OF LOS ANGELES, CALIFORNIA.

COMBINATION THEFT-NOTICE AND ILLUMINATED LICENSE-PLATE.

1,283,150.   Specification of Letters Patent.   Patented Oct. 29, 1918.

Application filed December 26, 1917.   Serial No. 208,800.

*To all whom it may concern:*

Be it known that I, GEORGE D. GILMORE, a citizen of the United States, residing at Los Angeles, in the county of Los Angeles and State of California, have invented new and useful Improvements in Combination Theft-Notices and Illuminated License-Plates, of which the following is a specification.

My object is to make a license plate for automobiles and the like, the license plate having means by which it may be mutilated, and the reading disarranged, to indicate that the automobile is being illegally operated.

Another object of my invention is to combine a mutilatable license plate with a tail light, the tail light serving as a means for illuminating the license plate.

My invention consists in the novel features herein shown, described and claimed.

Figure 1 is a fragmentary rear elevation of an automobile, showing my combination theft notice and illuminated license plate in use, the reading of the license plate being mutilated to indicate that the use of the automoble is unauthorized.

Fig. 2 is a view in elevation of the license plate with its reading restored to normal condition to indicate that the use of the car is authorized.

Fig. 3 is a vertical cross-section on the line 3—3 of Fig. 1.

Fig. 4 is an enlarged fragmentary rear elevation of the license plate as shown in Fig. 1, parts being broken away to show the construction.

Fig. 5 is an enlarged sectional detail through the lock and taken on the line 5—5 of Fig. 6, parts being shown in a locked position.

Fig. 6 is a fragmentary front elevation looking in the direction indicated by the arrow 6 in Fig. 5.

Fig. 7 is a view analogous to Fig. 5 and taken on the lines 7—7 of Figs. 2 and 8, the lock being shown in position to remove the key and leave the parts unlocked.

Fig. 8 is a fragmentary front elevation as indicated by the arrow 8 in Fig. 7.

Fig. 9 is a cross-section on the line 9—9 of Fig. 7 and on a plane parallel with Fig. 8.

Fig. 10 is a fragmentary sectional detail on the lines 10—10 of Figs. 2 and 4.

The bracket 1 is adapted to be secured to the lower face and rear end of the body 2 of the automobile by an attaching plate 3 and bolts 4. The bracket 1 extends downwardly and backwardly and has an attaching plate 5 on its rear end, said attaching plate 5 being inclined at an angle of about forty-five degrees relative to a horizontal or vertical line. The tail light housing has a vertical front plate 6 in which the lamp socket 7 is fixed and the lamp 8 is mounted in the socket 7 inside of the housing. Upper and lower inclined walls 9 and 10 extend from the upper and lower edges of the front plate 6, and similar walls extend from the ends of the plate to form a flaring box, and a rim 11 extends outwardly all the way around the rear edge of the box. The attaching plate 5 is secured to the upper wall 9 to hold the housing transversely of the automobile.

The main body 12 of the license plate has a rectangular plate fitting against the rim 11 and rigidly secured in place by bolts and nuts 13. The body plate 12 has perforated and lined figures 14 in position to be readable from the back of the automobile in daylight and in position to be illuminated from the lamp 8 so as to be readable at night. The certificate of ownership 15 is a brass or other similar plate secured to the body 12 at the opposite end from the figures 14 and above the name 16 of the State.

The mutilatable figure 17 is lined and perforated upon a circular disk 18, said figure 17 being adapted to match with the figure 14 to make the license plate number as shown in Fig. 2. A circular recess 19 is formed in the main body 12 and a circular opening 20 is formed through the main body 12 within the flange 21 forming the back of the recess 19. Bracket arms 22 extend diametrically inwardly from the flange 21 to support a bearing 23, said arms being inclined backwardly from the body 12 so as to locate the bearing 23 a short distance back of the body 12. An escutcheon cylinder 24 is rigidly fixed through the center of the disk 18 and the key cylinder 25 has a screw-threaded stud 26 extending from a shoulder 27 through the bearing 23, and a jam-nut 28 upon the stud 26 jams against the bearing 23 to hold the key cylinder 25 from rotating and so that the escutcheon cylinder 24 may rotate with the disk 18, the disk 18 fitting in the recess 19. The State seal 29 is secured to an indicating handle 30 formed integral with the disk 18 and extending outwardly in front of the body 12 in position to normally cover the certificate of ownership 15 when the figure 17 is in its normal position, as in Fig. 2. It is intended that when the indicating handle 30 is moved upwardly to an angle of forty-five degrees relative to a vertical or horizontal line, as in Fig. 1, the certificate of ownership will be uncovered and the figure 17 will stand at an angle relative to the remaining figure 14 so as to mutilate and disarrange the number of the license and when the disk 18 is in this position it is desired that the parts of the lock 31 shall be in their locked positions so as to hold the figure 17 from being righted. When in this position the parts are locked and the automobile left to stand with the license number mutilated so that if an unauthorized person or a thief attempts to run away with the automobile the condition of the license plate will indicate to a traffic officer or to any one paying attention to the matter, that the automobile is being stolen or being operated by an unauthorized person. A spring 33 is connected to one of the arms 22 and to the escutcheon cylinder 24 like a clock spring, the tension of the spring being exerted to move the disk 18 from its normal position. A notch 34 is formed in the edge of the disk 18, a flat spring 35 is secured against the rear face of the body plate 12, and the free end of the spring is turned backwardly to engage in the notch 34 to hold the disk 18 in its normal position as shown in Fig. 2. A second leaf spring 36 is secured against the back plate of the body 12 at right angles to the spring 35, the free end of the spring 36 pressing forwardly against the center of the spring 35 and a push-button 37 is fixed upon the free end of the spring 36 and extends through the body 12 so that the catch may be operated from the rear of the automobile. A stop 38 is secured against the rear face of the disk 18 to engage one of the arms 22 and limit the rotation of the disk under the tension of the spring 33.

When the license number is normal, as in Fig. 2, with the seal 29 extending horizontally and the figure 17 matching with the figures 14 to produce the complete license number, the automobile is ready for use. When the automobile has been driven to a standing position, as in a garage or parked, the operator presses the push-button 37 to release the catch 35 and the spring 33 rotates the disk 18 to throw the indicating handle 30 upwardly to throw the seal 29 out of line with the number and to partly rotate the figure 17. In this position the stop 38 holds the disk 18 in position for the tumblers 39 to enter the key cylinder 25 and the parts are locked and the license number mutilated to indicate that the automobile is out of use and to indicate to anyone seeing the automobile traveling upon a highway that it is being stolen or used by an unauthorized party. In order to return the license number to its normal position it is necessary to insert the key 32 into the lock to raise the tumblers 39 out of the key cylinder, then rotate the disk 18 against the tension of the spring until the catch 35 engages in the slot 34 to hold the disk 18 in its normal position. Then it is necessary to remove the key from the lock.

A slot 40 is formed in the escutcheon cylinder from the key cylinder bore 41 at an angle of forty-five degrees relative to the tumbler bores 42 so that when the disk 18 has been rotated to its normal position the slot 40 will be in position to receive the cylinder tumblers 43 and allow the key to be withdrawn, said cylinder tumblers going up into the slot 40 as they pass the points 44 on the key and as the key is withdrawn these tumblers will fall back into the key cylinder. A spring 45 in the slot 40 pushes the tumblers back flush with the cylinder when the key is withdrawn.

The tail light housing secured to the license number plate all the way around its edge will strengthen the plate and make it possible to use lighter material throughout the construction. The license number may be renewed simply by renewing the seal 29. By the use of a single light I provide a tail light and an illuminated license number and a theft notice. The device is compactly built and thoroughly fastened together so that there is no way of restoring the number to normal condition except by the use of the proper key and the device is mounted upon the automobile by the use of a single substantial bracket.

It is thought that when the license number is mutilated in accordance with my invention a thief or unauthorized borrower will hesitate to take the automobile and that if he does take the automobile he is publishing to all passersby and traffic officers the fact that he is operating a stolen car. The theft notice will be as apparent in the night as in the day and any tampering with the theft notice or the extinguishment of the light will simply make the theft still more conspicuous.

Instead of making one of the figures of the license number movable, the name of the State might be made movable to mutilate the reading of the number, or any intermediate one of the figures may be movable instead of the first figure.

A thief might cover up the first figure and thereby disguise the fact that the number was mutilated.

While I have here shown the preferred construction of my combination theft notice and illuminated license plate as now known to me, it will be understood by those skilled in the art that various changes in the construction, combination and arrangement of parts may be made without departing from the spirit of my invention as claimed.

I claim:

1. A license number for automobiles, having key controlled means for mutilating the number and restoring it to normal condition at will.

2. A license number comprising a lamp housing, a bracket for supporting the lamp housing, a lamp in the lamp housing, a number plate secured to one side of the lamp housing and having lined and perforated figures, and a second number plate movably mounted and having a lined and perforated figure normally reading with the other figures and adapted to be disarranged to mutilate the number.

3. A license number comprising a rigid plate having figures upon its outer face, a second plate movably mounted upon the first plate and having a figure normally reading with the other figures and adapted to be moved to mutilate the number, and a key lock for controlling the second plate.

4. A license number construction comprising a lamp housing, a number plate forming one side of the lamp housing and having lined and perforated figures and having a recess extending from its outer face, a second plate rotatably mounted in the recess and having a lined and perforated figure, an indicating handle extending from the second plate, a seal mounted upon the indicating handle, the handle being horizontal with the figure when the figure is in normal position to read in the number; and lock and key means for holding the handle and figure out of normal position to mutilate the number and for restoring the number to normal.

5. A combination theft notice and illuminated license plate, comprising a tail light, an illuminated license number behind the tail light, and lock and key means for mutilating the license number to give notice of theft, and to restore the license number to normal, as desired.

In testimony whereof I have signed my name to this specification.

GEO. D. GILMORE.